US011710067B2

United States Patent
Harris et al.

(10) Patent No.: US 11,710,067 B2
(45) Date of Patent: Jul. 25, 2023

(54) OFFLINE SECURITY VALUE DETERMINATION SYSTEM AND METHOD

(71) Applicant: Visa International Service Association, San Francisco, CA (US)

(72) Inventors: Theodore Harris, San Francisco, CA (US); Yue Li, Sunnyvale, CA (US); Tatiana Korolevskaya, Mountain View, CA (US); Craig O'Connell, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 805 days.

(21) Appl. No.: 16/598,829

(22) Filed: Oct. 10, 2019

(65) Prior Publication Data

US 2020/0118028 A1 Apr. 16, 2020

Related U.S. Application Data

(60) Provisional application No. 62/743,835, filed on Oct. 10, 2018.

(51) Int. Cl.
*G06N 20/00* (2019.01)
*H04L 9/40* (2022.01)
*H04W 36/36* (2009.01)

(52) U.S. Cl.
CPC ......... *G06N 20/00* (2019.01); *H04L 63/1416* (2013.01); *H04L 63/1425* (2013.01); *H04L 63/1433* (2013.01); *H04L 63/20* (2013.01); *H04W 36/365* (2013.01)

(58) Field of Classification Search
None
See application file for complete search history.

(56) References Cited

U.S. PATENT DOCUMENTS

| | | | |
|---|---|---|---|
| 10,382,461 B1 * | 8/2019 | Sharifi Mehr | H04L 63/1425 |
| 10,728,121 B1 * | 7/2020 | Chitalia | H04L 41/22 |
| 2013/0074182 A1 * | 3/2013 | Ikeda | G06F 21/00 726/22 |
| 2013/0086676 A1 * | 4/2013 | Chess | G06F 21/554 726/22 |
| 2013/0276114 A1 * | 10/2013 | Friedrichs | G06F 21/56 726/23 |
| 2014/0020094 A1 * | 1/2014 | Wang | G06F 21/566 726/22 |
| 2017/0005988 A1 * | 1/2017 | Bansal | H04L 41/0846 |
| 2019/0319978 A1 * | 10/2019 | Giffard | G06F 16/2255 |

* cited by examiner

*Primary Examiner* — Haimei Jiang
(74) *Attorney, Agent, or Firm* — Kilpatrick Townsend & Stockton LLP

(57) ABSTRACT

A method including collecting, by a communication device comprising a machine learning model obtained at least in part from a server computer, metadata associated with an application. The communication device can then embed the metadata to form vectorized data. The communication device can input the vectorized data into the machine learning model to obtain a security value. The communication device can determine whether to run or install the application based upon the security value.

14 Claims, 7 Drawing Sheets

US 11,710,067 B2

OFFLINE SECURITY VALUE DETERMINATION SYSTEM AND METHOD

CROSS-REFERENCE TO RELATED APPLICATIONS

This application claims the benefit of U.S. Provisional Application No. 62/743,835, filed Oct. 10, 2018, which is herein incorporated by reference in its entirety for all purposes.

BACKGROUND

As more types of communication devices are introduced, creating universal risk models based on device information becomes increasingly difficult. Additionally, data created by each communication device can change over time. The dynamic time-variant nature of the data can further introduce difficulties into the creation of a universal risk model. For example, applications can be installed on and/or removed from the communication device which can rapidly change the data associated with the device as well as the data's format.

Embodiments of the invention address these and other problems individually and collectively.

BRIEF SUMMARY

One embodiment of the invention is related to a method comprising: collecting, by a communication device comprising a machine learning model obtained at least in part from a server computer, metadata associated with an application; embedding, by the communication device, the metadata to form vectorized data; inputting, by the communication device, the vectorized data into the machine learning model to obtain a security value; and determining, by the communication device, whether to run or install the application based upon the security value.

Another embodiment of the invention is related to a communication device comprising: a processor; a machine learning model obtained at least in part from a server computer; and a computer-readable medium coupled to the processor, the computer-readable medium comprising code, executable by the processor for implementing a method comprising: collecting metadata associated with an application; embedding the metadata to form vectorized data; inputting the vectorized data into the machine learning model to obtain a security value; and determining whether to run or install the application based upon the security value.

Further details regarding embodiments of the invention can be found in the Detailed Description and the Figures.

DETAILED DESCRIPTION

Figure 1:
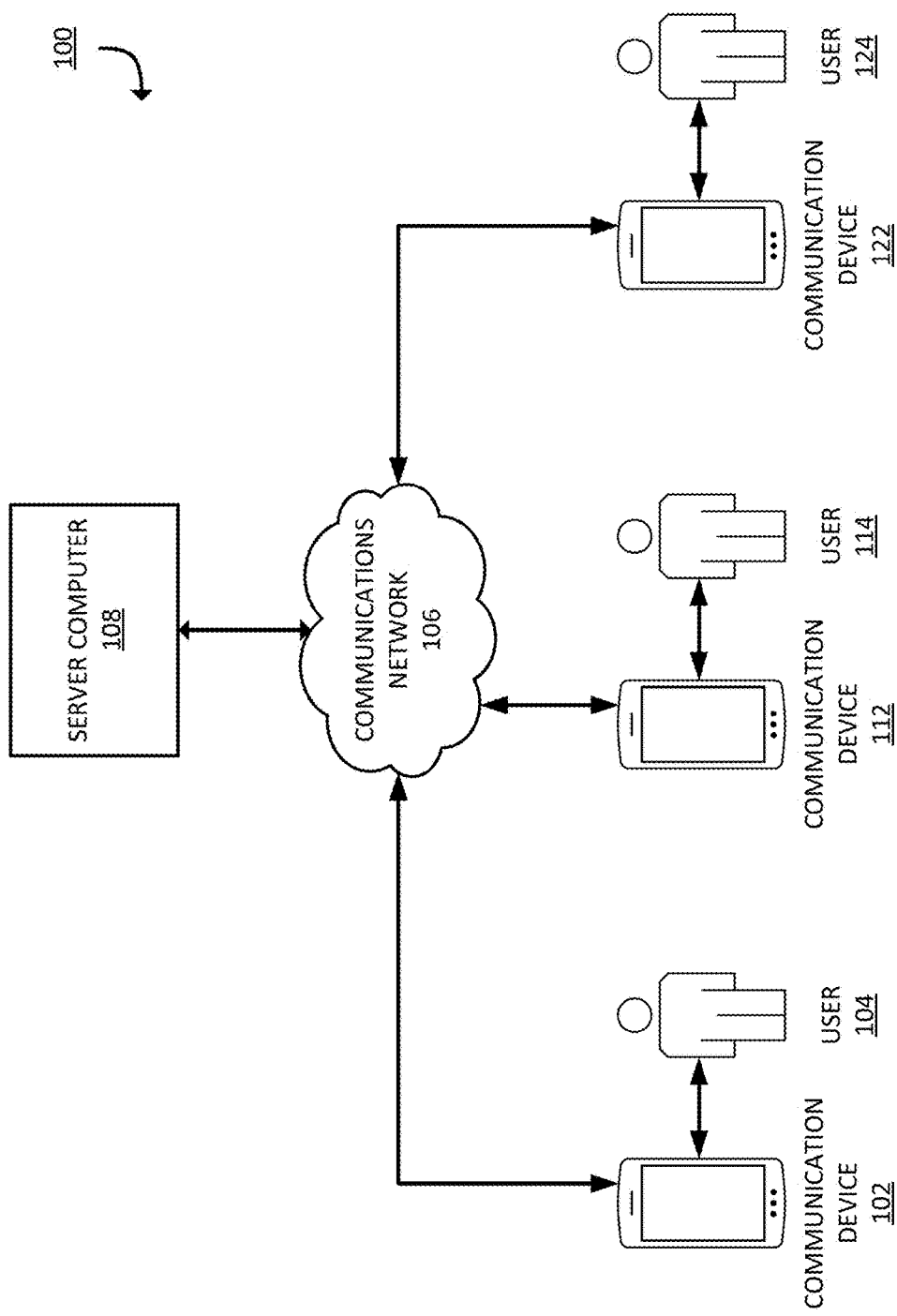
FIG. 1 shows a block diagram of a communication system according to embodiments.

Prior to discussing embodiments of the invention, some terms can be described in further detail.

A "user" may include an individual. In some embodiments, a user may be associated with one or more personal accounts and/or communication devices. The user may also be referred to as a cardholder, account holder, or consumer in some embodiments.

A "communication device" may comprise any suitable electronic device that may be operated by a user, which may also provide remote communication capabilities to a network. A "mobile communication device" may be an example of a "communication device" that can be easily transported. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of communication devices include mobile phones (e.g. cellular phones), PDAs, tablet computers, net books, laptop computers, personal music players, hand-held specialized readers, etc. Further examples of communication devices include wearable devices, such as smart watches, fitness bands, ankle bracelets, rings, earrings, etc., as well as automobiles with remote communication capabilities. In some embodiments, a communication device can function as a payment device (e.g., a communication device can store and be able to transmit payment credentials for a transaction).

A "topological graph" may include a representation of a graph in a plane of distinct vertices connected by edges. The distinct vertices in a topological graph may be referred to as "nodes." Each node may represent specific information for an event or may represent specific information for a profile of an entity or object. The nodes may be related to one another by a set of edges, E. An "edge" may be described as an unordered pair composed of two nodes as a subset of the graph G=(V, E), where is G is a graph comprising a set V of vertices (nodes) connected by a set of edges E. For example, a topological graph may represent a transaction network in which a node representing a transaction may be connected by edges to one or more nodes that are related to the transaction, such as nodes representing information of a device, a user, a transaction type, etc. An edge may be associated with a numerical value, referred to as a "weight", that may be assigned to the pairwise connection between the two nodes. The edge weight may be identified as a strength of connectivity between two nodes and/or may be related to a cost or distance, as it often represents a quantity that is required to move from one node to the next.

The term "artificial intelligence model" or "AI model" may include a model that may be used to predict outcomes in order achieve a pre-defined goal. The AI model may be developed using a learning algorithm, in which training data is classified based on known or inferred patterns. An AI model may also be referred to as a "machine learning model" or "predictive model."

"Unsupervised learning" may include a type of learning algorithm used to classify information in a dataset by labeling inputs and/or groups of inputs. One method of unsupervised learning can be cluster analysis, which can be used to find hidden patterns or grouping in data. The clusters may be modeled using a measure of similarity, which can defined using one or metrics, such as Euclidean distance.

"Machine learning" may include an artificial intelligence process in which software applications may be trained to make accurate predictions through learning. The predictions can be generated by applying input data to a predictive model formed from performing statistical analysis on aggregated data. A model can be trained using training data, such that the model may be used to make accurate predictions. The prediction can be, for example, a classification of an image (e.g. identifying images of cats on the Internet) or as another example, a recommendation (e.g. a movie that a user may like or a restaurant that a consumer might enjoy).

A "subgraph" or "sub-graph" may include a graph formed from a subset of elements of a larger graph. The elements may include vertices and connecting edges, and the subset may be a set of nodes and edges selected amongst the entire set of nodes and edges for the larger graph. For example, a plurality of subgraph can be formed by randomly sampling graph data, wherein each of the random samples can be a subgraph. Each subgraph can overlap another subgraph formed from the same larger graph.

A "community" may include a group/collection of nodes in a graph that are densely connected within the group. A community may be a subgraph or a portion/derivative thereof and a subgraph may or may not be a community and/or comprise one or more communities. A community may be identified from a graph using a graph learning algorithm, such as a graph learning algorithm for mapping protein complexes. Communities identified using historical data can be used to classify new data for making predictions. For example, identifying communities can be used as part of a machine learning process, in which predictions about information elements can be made based on their relation to one another.

A "data set" may include a collection of related sets of information composed of separate elements that can be manipulated as a unit by a computer. A data set may comprise known data, which may be seen as past data or "historical data." Data that is yet to be collected, may be referred to as future data or "unknown data." When future data is received at a later point in time and recorded, it can be referred to as "new known data" or "recently known" data, and can be combined with initial known data to form a larger history.

An "application" can include a set of computer executable instructions installed on, and executed from, a device. Applications may be installed, for example, on a communication device. An application can include any suitable functionality. For example, an application can be a communication application, an authentication application, a gaming application, an authorization application, a social media application, an information application, etc.

"Metadata" can include a set of data that describes and/or provides information about other data. Metadata can include data relating to an application installed and/or in a state of pending installation on the communication device. Metadata relating to an application can include, for example, an application data manifest. In some embodiments, metadata may also include wireless data, user setting data, device telematics, etc.

"Vectorized data" can include data represented by one or more vectors. In some embodiments, vectorized data can include a vectorized form of metadata. For example, in some embodiments, vectorized data can be determined, by a communication device, from the metadata via an embedding process.

A "security value" can include a numerical value representing a state of being free from danger or threat. A security value can include any suitable numerical value (e.g., a percentage, an integer on a predetermined scale, a double, a float, etc.). In some embodiments, a device can determine a security value as an output of a machine learning model based on vectorized data as input.

A "processor" may include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

I. Introduction

Embodiments provide for systems and methods capable of determining whether or not an application on a communication device is a malicious application. For example, the communication device can comprise a machine learning model obtained at least in part from a server computer. For example, the communication device can provide initial data to the server computer, which the server computer may utilize in the training of the machine learning model. The machine learning model may be trained using data from the communication device as well as data from other similar communication devices (e.g., other communication devices of a similar community group as the communication device). The server computer can provide the machine learning model to the communication device.

At any suitable point in time after obtaining the machine learning model, the communication device can collect metadata associated with an application. For example, the communication device can collect metadata from a new gaming application installed on the communication device. The metadata, for example, can include an application data manifest from the new gaming application. After obtaining the metadata, the communication device can embed the metadata to form vectorized data. The communication device can embed the metadata in any suitable manner, as described herein.

The communication device can then input the vectorized data into the machine learning model to obtain a security value. For example, the machine learning model can be a neural network, or any other suitable machine learning model, which can be capable of determining a security value based on input metadata. In some embodiments, the security value can indicate whether or not the new gaming application is malicious. Based on the security value, the communication device can determine whether to run or install the application based. For example, the communication device can determine to run the new gaming application if the security value associated with the gaming application exceeds a predetermined threshold. As another example, the communication device can determine to block the new gaming application from running if the security value does not exceed the predetermined threshold (e.g., is below the threshold).

II. Systems

Embodiments of the disclosure may include a system as described herein. The system can be described in reference to FIGS. 1 and 2. However, it is understood that embodiments may include any suitable system configured to perform the methods as described in reference to FIGS. 3-7.

A. System Overview

FIG. 1 shows a block diagram of a system 100 comprising a number of components according to embodiments. The system 100 can comprise a plurality of communication devices (102, 112, and 122) which may be operated by a plurality of users (104, 114, and 124). The system 100 can further comprise a communications network 106 operatively located between the plurality of communication devices (102, 112, and 122) and a server computer 108. In embodiments, the plurality of users, such as user 104, 114, 124, etc. may each possess a communication device. Each communication device (e.g., 102, 112, 122, etc.) can be a device, such as a mobile phone, laptop, smart watch or other wearable device, and/or any other suitable communication devices described herein. The communication devices (102, 112, and 122) of system 100 can be in operative communication with a communications network 106, which may facilitate communication with the server computer 108.

Message between the communication devices (102, 112, and 122) and the server computer 108, transmitted via the communications network 106, illustrated in FIG. 1 may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like. The communication network 106 may include any suitable communication medium. The communication network 106 may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

The communication devices (102, 112, and 122) can communicate data (e.g., metadata, etc.) with the server computer 108 via the communications network 106. For example, the communication device 102 can collect initial data associated with one or more currently installed applications and device data. The initial data can include user information, device information, metadata and/or any other data stored on the communication device 102. The communication device 102 can then provide the initial data to the server computer 108 via the communications network 106.

Upon receiving the initial data, the server computer 108 can, in some embodiments, train a machine learning model based on the initial data as well as communication device metadata from one or more additional communication devices (e.g., 112 and 122). The server computer 108 can then provide the machine learning model to the communication device 102.

Figure 6:
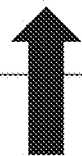
FIG. 6 shows an example illustration of embedding metadata according to embodiments.

The communication device 102 can then receive and store the machine learning model. At any suitable point in time thereafter, the communication device 102 can collect metadata associated with an application. For example, the application may be a gaming application, a social media application, a banking application, an authorization application, an authentication application, an information application, etc. After collecting the metadata, the communication device 102 can embed the metadata to form vectorized data. For example, the communication device 102 can determine vectorized data of a vector space which corresponds to the input metadata. For example, the metadata can be embedded as shown in FIG. 6.

Upon forming the vectorized data, the communication device 102 can input the vectorized data into the machine learning model to obtain a security value. The communication device 102 can determine whether to run or install the application based upon the security value.

The steps above are described in reference to the communication device 102, however, it is understood that any communication device (e.g., 102, 112, 122, etc.) may perform the steps.

In some embodiments, the server computer 108 may include a plurality of server computers, which may each be capable of processing data relating to actions undertaken by users on their communication devices.

B. Communication Device

Figure 2:
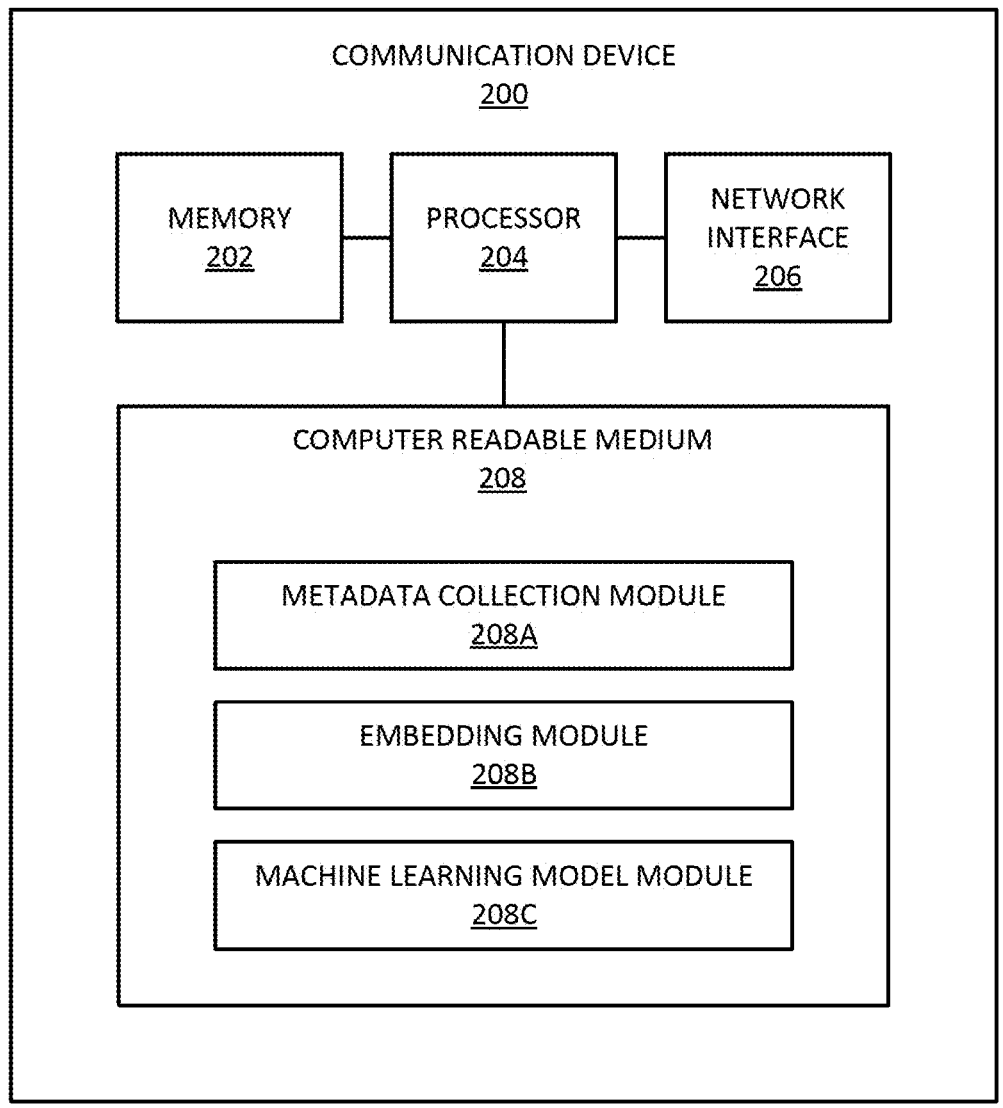
FIG. 2 shows a block diagram illustrating a communication device according to embodiments.

FIG. 2 shows a block diagram of an communication device 200 according to embodiments. The exemplary communication device 200 may comprise a processor 204. The processor 204 may be coupled to a computer readable medium 208, a memory 202, and a network interface 206. The computer readable medium 208 can comprise a metadata collection module 208A, an embedding module 208B, and a machine learning model module 208C.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store cryptographic keys, metadata, vectorized data, security values, etc.

The computer readable medium 208 may comprise code, executable by the processor 204, for performing a method comprising: collecting, by a communication device comprising a machine learning model obtained at least in part from a server computer, metadata associated with an application; embedding, by the communication device, the metadata to form vectorized data; inputting, by the communication device, the vectorized data into the machine learning model to obtain a security value; and determining, by the communication device, whether to run or install the application based upon the security value.

The metadata collection module 208A may comprise code or software, executable by the processor 204, for collecting metadata. The metadata collection module 208A, in conjunction with the processor 204, can collect metadata from one or more applications installed and/or in a state of pending installation on the communication device 200.

For example, a gaming application may be installed on the communication device 200. The metadata collection module 208A, in conjunction with the processor 204, can retrieve the metadata from the gaming application. The metadata collection module 208A, in conjunction with the processor 204, can retrieve the metadata in any suitable manner, for example, by using an API call to the gaming application. In other embodiments, the gaming application can store metadata in the memory 202, from which the metadata collection module 208A, can retrieve the metadata.

In some embodiments, the metadata from one or more applications can include an application data manifest. The application data manifest can be, for example, an XML file. The application data manifest can include any suitable information relating to the application. For example, the application data manifest may include the application's package name (e.g., which may match the code's namespace), the components of the application (e.g., activities, services, broadcast receivers, content providers, etc.), the permissions that the application needs in order to access protected parts of the system or other applications, the hardware and software features the application requires, and/or any other data related to the application. The components of the application can further include details of the capabilities of the application (e.g., which device configurations the application can handle, the intent filters that describe how the component can be started, etc.).

The embedding module 208B may comprise code or software, executable by the processor 204, for embedding data. The embedding module 208B, in conjunction with the processor 204, can embed the metadata to form vectorized data. In some embodiments, embedding can include transforming input data to output data while maintaining the underlying meaning of the input data in relation to other input data. The embedding module 208B, in conjunction with the processor 204, can perform an embedding process (e.g., embed) in any suitable manner. The embedding module 208B, in conjunction with the processor 204, can map discrete and/or categorical variables to a vector, or matrix, of continuous numbers. In some embodiments, the result of an embedding process (e.g., vectorized data) may be referred to as an embedding. The embedding can be a low-dimensional, learned continuous vector representation(s). To construct representations of the vectorized data, the embedding module 208B, in conjunction with the processor 204, can utilize an embedding neural network and a supervised task to learn the embedding(s). In some embodiments, communication device 200 can take advantage of the overall patterns of location and distance between vectors.

As an example, if one has input data (e.g., input to the embedding module 208B) that includes 50,000 words used in a collection of movie reviews, the embedding module 208B, in conjunction with the processor 204, could learn 100-dimensional embeddings for each word using an embedding neural network trained to predict the sentimentality of the reviews. Words in the vocabulary that are associated with positive reviews such as "brilliant" or "excellent" can come out closer in the embedding space because the neural network has learned these are both associated with positive reviews.

In some embodiments, the embeddings determined by the embedding module 208B, in conjunction with the processor 204, can be the parameters, or weights, of the neural network that are adjusted during training to minimize the loss on the supervised task. The embedding module 208B, in conjunction with the processor 204, can determine the embedding weights (e.g., the vectorized data which may be continuous vectors). Further details regarding embedding can be found in [Alon, Uri, et al. "code2vec: Learning distributed representations of code." *Proceedings of the ACM on Programming Languages* 3.POPL (2019): 40.] where embeddings of code snippets are determined, which is herein incorporated by reference.

The machine learning model module 208C may comprise code or software, executable by the processor 204, for determining an output of a machine learning model based on an input. In some embodiments, the machine learning model module 208C may further comprise code or software, executable by the processor 204, for training a machine learning model. In some embodiments, the machine learning module 208C can contain code that defines a machine learning model, as well as code that can enable the processor 204 to train the machine learning model. The trained machine learning model can accept feature inputs and determine an output (e.g., a classification, prediction, etc.) for each input vector. The machine learning module 208C, in conjunction with the processor 204, may use suitable machine learning models based on algorithms including, but not limited to: neural networks, decision trees, support vector methods, and K-means algorithms.

For example, the machine learning module 208C, in conjunction with the processor 204, can build a mathematical model based on sample data, known as "training data," to make predictions or decisions without being explicitly programmed to perform the task. In some embodiments, the machine learning module 208C, in conjunction with the processor 204, can train a neural network. A neural network can be a model based on a collection of connected units or nodes called artificial neurons. Each connection (e.g., edge) can transmit information (e.g., a signal) from node to another. A node that receives a signal can process it and then signal additional nodes connected to it. In some embodiments, the signal at a connection between nodes can include a real number, and the output of each node can be computed by some non-linear function of the sum of its inputs. Nodes and edges can have a weight that adjusts as learning proceeds. The weight may increase or decrease the strength of the signal at an edge. In some embodiments, nodes may have a threshold such that the signal is only sent if the aggregate signal crosses that threshold. Different layers of the neural network may perform different kinds of transformations on their inputs. Further, signals can travel from the first layer (e.g., the input layer), to the last layer (e.g., the output layer), possibly after traversing middle layer(s) (e.g., hidden layer(s)).

As an illustrative example, the communication device 200 can input the vectorized data determined by the embedding module 208B into the machine learning model of the machine learning model module 208C to obtain a security value. For example, the vectorized data may be vectors determined by embedding an application data manifest of a new application installed on the communication device 200. The machine learning model can determine a security value which can indicate whether or not the new application is a fraudulent application. For example, a malicious party may create many malicious gaming applications. In order to increase their rate of creation of malicious applications, the malicious party may copy code from one malicious application to another and simply reskin the malicious applications. The machine learning model can determine, for example, a low security value if the application data manifest indicates that the new gaming application includes components that are characteristic of applications made by the malicious party. The low security value can indicate that the gaming application has a high probability of being malicious.

The communication device 200 can then determine to not run the new gaming application, or to not install the new gaming application if the installation is pending based on the security value. For example, if the security value exceeds a predetermined threshold, then the communication device 200 can determine to run or install the application.

The network interface 206 may include an interface that can allow the communication device 200 to communicate with external computers. The network interface 206 may enable the communication device 200 to communicate data to and from another device (e.g., a server computer via a communications network, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

C. Server Computer

The server computer can communicate with the communication device 200 via a communications network (e.g., the communications network 106 of FIG. 1). The server computer can include any suitable components which may allow the server computer to perform the functionalities as described herein. The server computer can comprise any suitable components. For example, the server computer can comprise a processor, which may be coupled to a computer readable medium, a memory, and a network interface. The computer readable medium of the server computer can comprise any suitable modules. In some embodiments, the server computer can further comprise a plurality of data stores. For example, the server computer can comprise data stores such as a device profile graph data store, a user behavior graph data store, a device profile graph data store, a network profile graph data store, etc. In some embodiments, the server computer can be a cloud service.

III. Methods

Embodiments can use the systems and apparatuses described herein to at least determine whether to run or install an application based on a determined security value. FIGS. 3-7 describe some examples of such methods.

In some embodiments, a communication device can comprise a machine learning model obtained at least in part from a server computer. For example, the communication device can receive the machine learning model from the server computer and, in some embodiments, further train the machine learning model using additionally collected metadata locally. The communication device can collect metadata associated with an application. For example, the application may be an application stored (e.g., installed) on the communication device. In other embodiments, the application may be an application which the user is attempting to install on the communication device.

After collecting the metadata, the communication device can then embed the metadata to form vectorized data. The communication device can embed the metadata in any suitable manner as described in further detail herein. The communication device can then input the vectorized data into the machine learning model to obtain a security value. The communication device can determine whether to run or install the application based upon the security value.

Embodiments of the disclosure can allow for adaptation as a communication device's settings and installed applications change over time. Embodiments can provide for the ability to capture and translate the dynamic input into strong signals from various applications, devices, and users. For example, first, a device's setting, applications, and usage can be modeled as a dynamic, non-stationary knowledge graph with temporal attributes. A graph learner (e.g., a modified streaming graph learner which can take into consideration the transitory nature of some relations via reliability analysis and/or survival analysis) can then be used to create embedded data for downstream consumption and/or processing.

In some embodiments, to further provide stability in the generated features, details of the metadata, such as shape of distribution, frequency, and/or other descriptive statics, can be evaluated. The shape of the time series plot of a continuous of discrete feature can be categorized by a deep learning algorithm.

A. Streaming Graph Learner with Streaming Reliability Analysis for Embedding

The communication device can embed the metadata to form vectorized data in any suitable manner. For example, in some embodiments, the communication device can embed the metadata using a learner, which may be a streaming graph learner.

In some embodiments, the learner can be a modified streaming graph learner with a reliability term added to a weight—so nodes with a higher survival can be ranked higher even if they are seen less than nodes that grow quickly and then fade. In this way, trends in the metadata which are persistent overtime can be ranked higher than other short term trends and fluctuations. In some cases, this may be a preferred method over using a rolling average, which can diminish the influence of past seldom repeated relationships but does so uniformly. This means that relationships which are purely transitory are treated identically to ones which are repeated but with a long period between events. Using streaming survival analysis, patterns that persist over time, regardless of the regularity of those patterns, can remain in the knowledge base.

Embodiments of the disclosure can employ a streaming graph algorithm due to the nature of the end use. For example, communication devices may have limited file storage capability, in which case, the communication device can transmit data to the server computer, which can train a machine learning model using the data from the communication device as well as other similar communication devices. For example, the system can move some computation to the server computer, rather than the communication device.

For example, in some embodiments, the metadata may be converted into a sub-graph (e.g., a graph snippet) which may be used for both model building as well as determining to which community group the communication data belongs. The communication device may also retrieve peer sub-graphs from the server computer, where the received peer sub-graphs include data from other communication devices that belong to the same community group as the communication device. In some cases, the streaming graph learner can be modified to base sort order and weights from values derived from a hazard function built using a minmax entropy model based on a edges time of creation and the entropy value derived from the vertices ego-nets.

B. Initialization Phase

When a new communication device is added to the network, the new communication device can communicate with a server computer which may use initial data received from the communication device to provide relevant data to enable offline modeling on the communication device.

Figure 3:
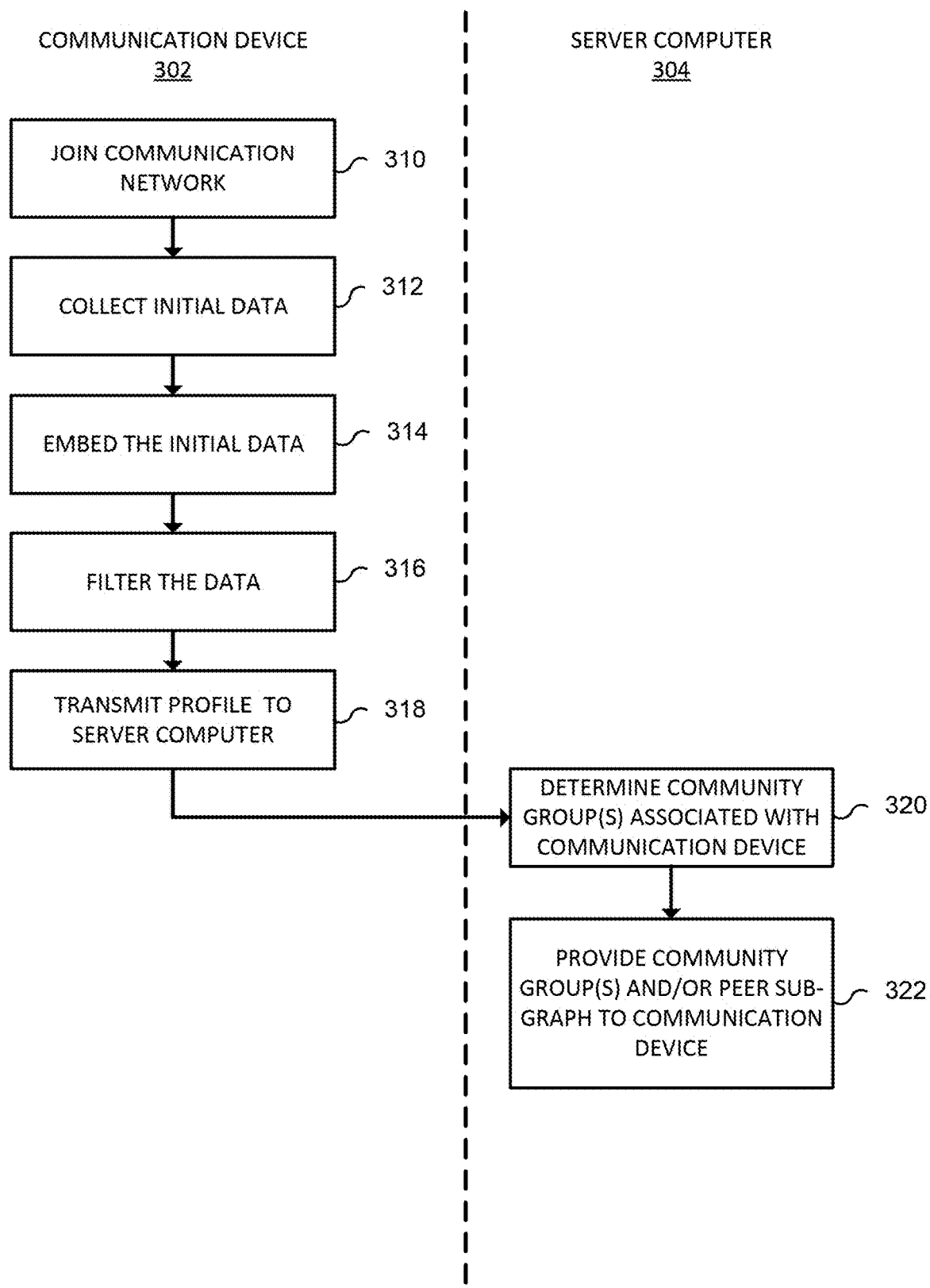
FIG. 3 shows a flow diagram illustrating a first initialization phase according to embodiments.

FIG. 3 shows a flow diagram illustrating a first initialization phase according to embodiments. The method illustrated in FIG. 3 will be described in the context of a user initializing a new communication device (e.g., a mobile phone) onto which the user can install applications. It is understood, however, that the invention can be applied to other circumstances. The method of FIG. 3 may be performed by a communication device 302 and a server computer 304.

At step 310, the communication device 302 can join the communication network (e.g., the system 100 of FIG. 1). The communication device 302 can join the communication network in any suitable manner.

At step 312, the communication device 302 can collect initial data. The initial data can include user information, device information, metadata and/or any other data stored on the communication device 302. Such information may include, for example, an application manifest, wireless data, user settings, device telematics, etc.

At step 314, after collecting the initial data, the communication device 302 can embed the initial data. For example, the communication device 302 can perform a neural network embedding process to determine vectorized data which represents the initial data. The output of the embedding process can include vectorized data.

In some embodiments, the communication device 302 can generate a profile based on the initial data. The profile may represent the communication device 302 and/or the user of the communication device 302. In some embodiments, the profile can be a graph which represents the initial data. For example, the metadata may be treated as a free text and processed using natural language processing in order to place the metadata in a form for use, in some embodiments.

In some embodiments, at step 316, after embedding the metadata, the communication device 302 may filter the vectorized data. For example, the communication device 302 may apply a privacy filter to the profile, which may exclude names, identifiers, zip, latitude, longitude, and/or any other suitable data relating to the privacy of the user of the communication device 302. The communication device 302 can, in some embodiments, exclude the sensitive information such as names, IDs, zip codes, locations, etc. from the graph based on the user's privacy settings.

At step 318, the communication device 302 can transmit the vectorized data, and in some embodiments, the graph (e.g., the profile which can be expressed as a graph) to the server computer 304.

In other embodiments, the communication device 302 can transmit the initial data to the server computer 304 after collecting the initial data. The server computer 304 may then embed the metadata to form the vectorized data.

At step 320, after receiving the profile, the initial data, and/or the vectorized data, the server computer 304 can determine one or more community groups associated with the communication device 302. For example, the one or more community groups can include a gaming community group, a shopping community group, a social media community group, and/or any other suitable type of community group.

The server computer 304 can determine the community groups in any suitable manner. For example, the server computer 304 can perform a clustering process which may cluster together data received from a plurality of communication devices. Data which is clustered together may be representative of a community group. For example, the data of one community group can share common characteristics. For example, the server computer 304 can perform an unsupervised clustering process which clusters communication devices based on the data received from the communication devices. One community group (e.g., a gaming community group) determined by the server computer can, for example, include communication devices which are predominately used for gaming (e.g., they comprise many gaming applications, have usage patterns which indicate significant amounts of time used for gaming, etc.).

At step 322, the server computer 304 can then provide the one or more community groups, peer sub-graphs, and/or expected usage patterns to the communication device 302. The peer sub-graphs can be, for example, a sub-graph which includes data related to communication devices (e.g., peers) of the same community group as the communication device 302. In some embodiments, the peer sub-graphs can be anonymized in any suitable manner (e.g., removal of names, identifiers, credentials, locations, dates, times, etc.). The peer sub-graph may contain a statistically significant sample of similar communication devices.

In some embodiments, after receiving the peer sub-graph the communication device 302 may train a machine learning model using the peer sub-graph, initial data, as well as any additionally collected metadata. In other embodiments, the communication device 302 can obtain a machine learning model trained on the sub-graph and/or initial data of the communication device 302 from the server computer 304. The machine learning model can be initially trained by the server computer 304. At any suitable time thereafter, the communication device 302 can further train the machine learning model with collected metadata.

Figure 4:
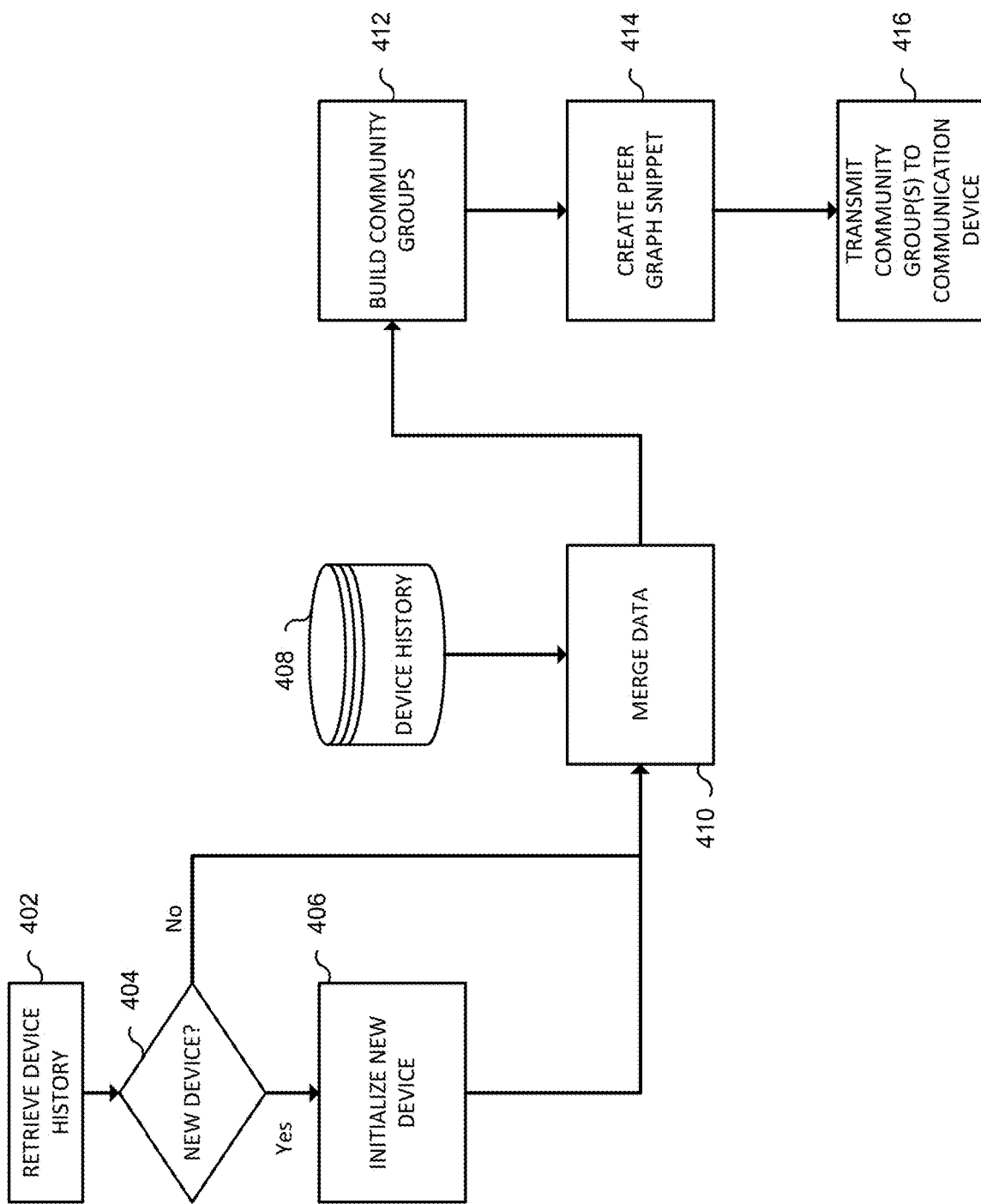
FIG. 4 shows a flow diagram illustrating a second initialization phase according to embodiments.

FIG. 4 shows a flow diagram illustrating a second initialization phase according to embodiments. The method of FIG. 4 can be performed by the server computer during the initialization phase. A server computer (e.g., the server computer 108 of FIG. 1) can communicate with a communication device (e.g., the communication device 102 of FIG. 1). At step 402, the server computer can retrieve device history from the communication device. For example, the server computer can query the communication device for the device history. The communication device can then respond to the query (e.g., provide the device history to the server computer). The device history can include any suitable user information, device information, metadata and/or any other data stored on the communication device. In some embodiments, if this is the first time that the server computer is receiving data from the communication device, then the device history can be initial data, as described herein.

At step 404, after receiving the device history, the server computer can then determine if the communication device is a new device (e.g., a communication device which has not previously provided data to the server computer). If the server computer determines that the communication device is a new device, then the process can proceed to step 406. If the communication device is not a new device, then the process can proceed to step 412.

At step 406, if the communication device is a new device, then the server computer can initialize a new device on the backend. For example, the server computer can create a new entry in a device database corresponding to the communication device. In some embodiments, the server computer can gather network data related to the communication device. For example, the server computer can request additional data from the communication device which includes network data. The network data can include any suitable data describing the network to which the communication device belongs. For example, the network data can include transmission rates, reception rates, network maps, routing tables, etc.

At step 408, the server computer can, in some embodiments, retrieve device history associated with the communication device from a device history database. In some embodiments, step 408 may occur if the communication device is not a new device, since there may not be any device history if the communication device is a new device. Further, in other embodiments, the server computer can sample data of the device history rather than using the full historical dataset of the communication device.

At step 410, if the communication device is not a new device or after gathering data from a new device, the server computer can merge the new data with historical data from the new device, if applicable. Additionally, if the data received from the communication device has not yet been embedded to form vectorized data, then the server computer can embed the device history data to form vectorized data as described herein.

At step 412, the server computer can build community groups based on the vectorized data. The server computer can determine the community groups in any suitable manner, as described herein.

At step 414, the server computer can create a peer sub-graph. The peer sub-graph can include metadata of peer communication devices that may be in the same community group as the communication device.

In some embodiments, the server computer can create expected behavior graphs, based on the peer sub-graph and/or received data. The expected behavior graphs may include expected behaviors in response to events. For example, an event of installing a new gaming application may be an expected behavior for a communication device associated with the gaming community group.

At step 416, the server computer can then transmit the graphs and/or community group(s) to the communication device. In some embodiments, the server computer can also provide the peer sub-graph and/or expected behavior graph to the communication device.

In other embodiments, the server computer can train a machine learning model using the data received from the communication device as well as the peer sub-graph. The server computer can train a neural network, binary tree, support vector machine (SVM), and/or any other suitable machine learning model. For example, the server computer can train a neural network capable of determining a security value based on an input (e.g., vectorized data). The server computer can train the machine learning model based on the peer sub-graph, for example, as further illustrated in FIG. 7. In some embodiments, the server computer can train a separate machine learning model for each sub-graph corresponding to each community group. For example, a sub-graph corresponding to a gaming community group may be used to train a first machine learning model which may be deployed, by the server computer, to communication devices associated with the gaming community group. A sub-graph corresponding to a social media community group may be used to train a second machine learning model which may be deployed, by the server computer, to communication devices associated with the social media community group.

C. Fraud Detection Phase

Figure 5:
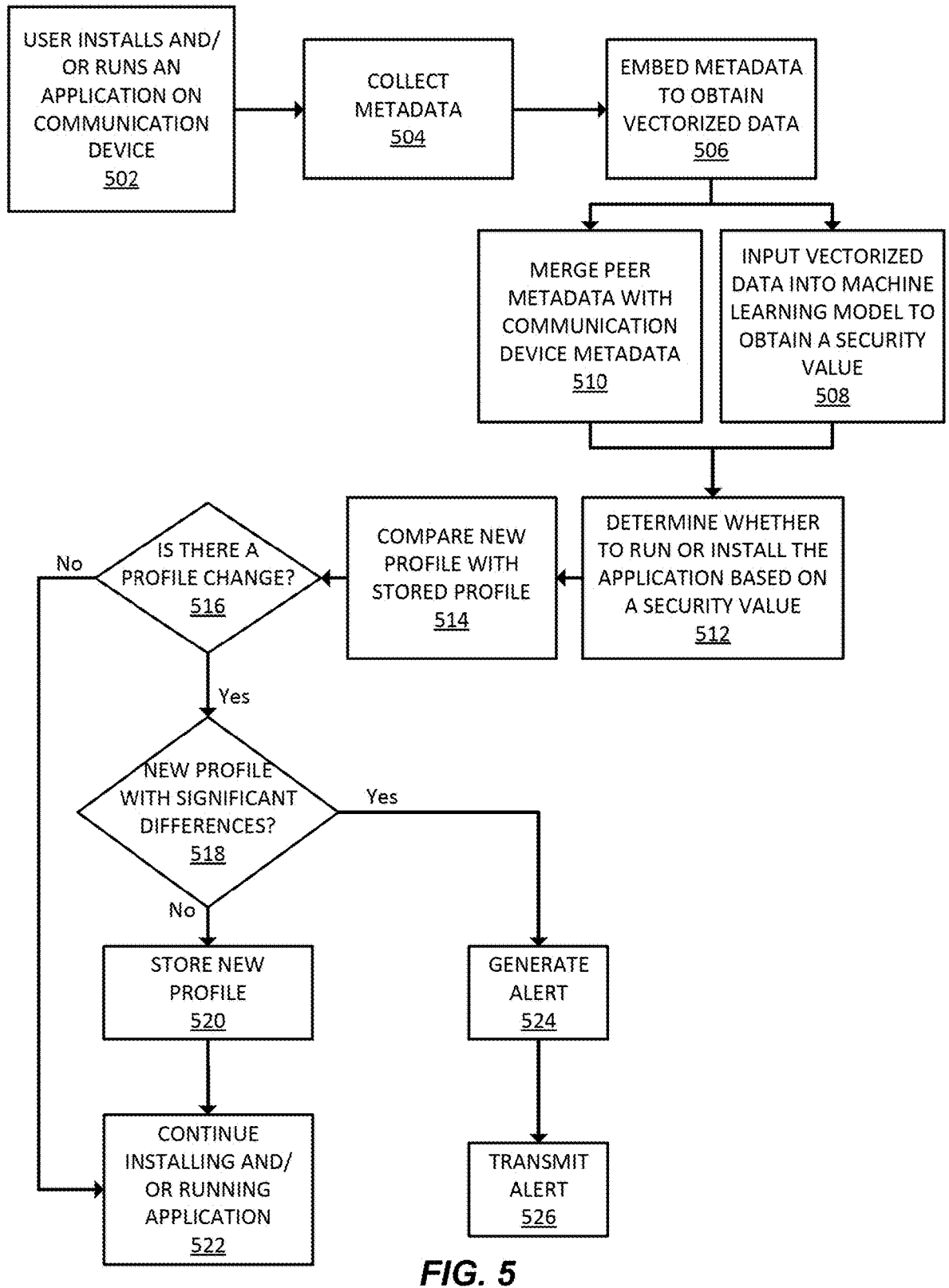
FIG. 5 shows a flow diagram illustrating a security phase according to embodiments.

FIG. 5 shows a flow diagram illustrating a security phase according to embodiments. The method illustrated in FIG. 5 will be described in the context of a user opens a banking application after changing something on their phone, such as downloading a new application. It is understood, however, that the invention can be applied to other circumstances (e.g., determining whether or not to run a newly installed application, determining whether or not to install a new application, determining whether or not to run a second application after installing a first application, etc.). The method as shown in FIG. 5 can be performed by a communication device (e.g., the communication device 200 of FIG. 2).

In some embodiments, at step 502, the user can install an application, which may be a new application. For example, the communication device can install a new gaming application. In other embodiments, at step 502, the user can attempt to run an application and/or a function in the application. For example, a user can attempt to run a banking application to access a secure account. In yet other embodiments, at step 502, a user can install a new gaming application then, at a suitable point in time later, run a banking application. The communication device can determine whether or not to run the banking application based on metadata collected from the new gaming application, as described herein.

At step 504, the communication device can collect metadata from one or more applications of the communication device. The metadata can include, for example, metadata relating to the new application. In some embodiments, the communication device can collect metadata from a plurality of applications stored on the communication device. The metadata can include any suitable data, such as, but not limited to, network data, application data, application code, etc.

At step 506, after collecting the metadata, the communication device can embed metadata to obtain vectorized data. In some embodiments, an embedding can be a mapping of a discrete or categorical variable to a vector of continuous numbers. In the context of neural networks, embeddings can be low-dimensional, learned continuous vector representations of discrete variables. Neural network embeddings can be useful because they can reduce the dimensionality of categorical variables and meaningfully represent categories in the transformed space. In some embodiments, a vector which may represent a portion of the input metadata can be determined using a neural network. The output of an embedding process can include vectorized data. The vectorized data can be of any suitable dimensionality.

The communication device can determine a vector representation (e.g., one vector of the vectorized data) for each input data (e.g., metadata). In some embodiments, the metadata may be converted into a graph format in any suitable manner known to one of skill in the art. Then, the nodes of the graph of metadata may be embedded into vectors.

The metadata may include data from a plurality of applications installed on the communication device. In some embodiments, two applications of the plurality of applications may be similar (e.g., as reflected in the metadata of the two application). For example, a first application and a second application may both be gaming applications created by the same developer. The metadata of the first application may be similar to the metadata of the second application. The vectorized data resulting from embedding the first metadata can be similar to the vectorized data resulting from embedding the second metadata due to the similarities in the application metadata.

At step 508, after obtaining the vectorized data, the communication device can input the vectorized data into the machine learning model to obtain a security value. The security value can include a numerical value representing a state of being free from danger or threat. The security value can include any suitable numerical value (e.g., a percentage, an integer on a predetermined scale, a double, a float, etc.). For example, the machine learning model may be a neural network configured to output a value between 0 and 1 (e.g., a security value) based on an input (e.g., vectorized data). The machine learning model may have been previously trained using metadata from one or more communication devices associated with a common community group (e.g., a gaming community group).

In some embodiments, at step 510, the communication device can also merge peer data (e.g., of a peer sub-graph previously received from the server computer) with the vectorized data.

At step 512, after determining the security value, the communication device can determine whether to run or install the application based upon the security value. For example, in some embodiments, the communication device can determine whether to run or install the application based upon the security value via steps 512-524. However, it is understood that the communication device can determine whether to run or install the application based upon the security value in any suitable manner. For example, in some embodiments, the communication device can compare the security value to a predetermined threshold. If the security value exceeds the threshold, then the communication device can run or install the application.

At step 514, the communication device can compare a new profile with a stored profile. The new profile can be created using the vectorized data from the machine learning mode. In some embodiments, the communication device may also determine a similarity score between currently evaluated data (e.g., vectorized data and/or new profile created therefrom) and a stored peer group profile. For example, the stored peer group profile may represent the characteristics, actions, etc. that may typically be performed by the peer communication devices associated with the same community group as the communication device. If a current action changes the communication device's profile, then the profile may differ from the stored peer group profile.

At step 516, the communication device can determine if there is a profile change. A profile change can indicate a change in user behavior. For example, a user which does not belong to the gaming community group, but instead belongs to a social media community group, may induce a profile change when installing a new gaming application. The profile change can indicate that a currently determined profile for the user differs from the previously stored profile. If there is not a profile change, then the process can proceed to step 522.

If the profile has changed, at step 518, the communication device can determine if the new profile is significantly different than the stored profile. If the new profile is significantly different, then the communication device can issue (e.g., generate and transmit) an alert to any suitable device, e.g., the communication device, the server computer, a second communication device, etc. If the new profile is not significantly different than the stored profile, then the communication device can store the new profile. The new profile may be stored in place of previous profiles as the user's habits change over time, but do not change so quickly as to be labelled as significant changes. In this way, the user's profile may drift over time.

In some embodiments, a significant difference between profiles may be defined by a predetermined difference amount. For example, the predetermined difference amount may be a numerical difference that is predetermined to signify a large enough difference to warrant the generation of an alert at step 524.

At step 522, after determining that the communication device is performing actions in accordance with the communication device's profile and/or after determining that the security value exceeds the threshold, the communication device can run the opened application (e.g., a banking application, gaming application, etc.) or install the application.

At step 524, after determining that the new profile is significantly different from the stored profile, the communication device can generate an alert. In some embodiments, after determining not to run or install the application based upon the security value, the communication device can generate an alert based on the security value.

At step 526, after generating the alert, the communication device can transmit the alert to any suitable remote computer (e.g., the server computer, a security computer, a communication device, etc.). The communication device can transmit the alert over any communications channel and/or communications network described herein.

As the data is received over time, a graph representing the metadata from a plurality of communication devices (stored by the server computer) can be built and adjusted incrementally. This can allow the community groups to grow and change organically, but also retain stability from prior structure. Additionally, older relationships can be eliminated from communities in an efficient manner, when the older relationships are no longer applicable.

As an additional illustrative example, the system may perform the following process. In some embodiments, the logic for executing the process may be mixed between a secure language and native code. First, a communication device can collect metadata (e.g., application manifest data) and vectorize it for a model using, for example, Visa Intelligent Data Access (VIDAC). In some embodiments, the communication device can model the metadata like a natural language in order to not have to model every individual application and device (e.g., the communication device can look for linguistic patterns in the metadata). The communication device can, for example, can scan for a signature in how the application was set up, which may indicate whether or not the application could be malicious. Then, the communication device can run a model expressed in, for example, PMML and XML on the communication device via Visa Edge Intelligence (VEI). The communication device can then, for example, determine to run an application based on a security value output by the model. The application may encrypt a message in any suitable manner and then generate a block for a blockchain with encrypted message(s) for transmission.

D. Example Metadata and Embedding into Vectorized Data

FIG. 6 shows an example illustration of embedding metadata according to embodiments. FIG. 6 includes metadata 602, application code 604, and vectorized data 606. The metadata 602 can be, for example, application manifest data retrieved from an application stored on the communication device. In some embodiments, the metadata 602 can be treated as a natural language (e.g., as free text) and may be processed in a graph. The application code 604 may allow the communication device to collect and embed the metadata 602 to form the vectorized data 606. In some embodiments, the embedding process can use frequency rules generated from a graph learner to normalize the free text of the metadata 602 to generate one or more than one numeric matrices suitable for machine consumption. The vectorized data 606 may be, for example, vectors corresponding to the metadata 602, formed via the embedding process. The vectorized data 606 can include any suitable number of vectors and may be of any dimensionality. In embodiments, each vector of the vectorized data 606 may be of the same dimensionality.

E. Graph Model

Figure 7:
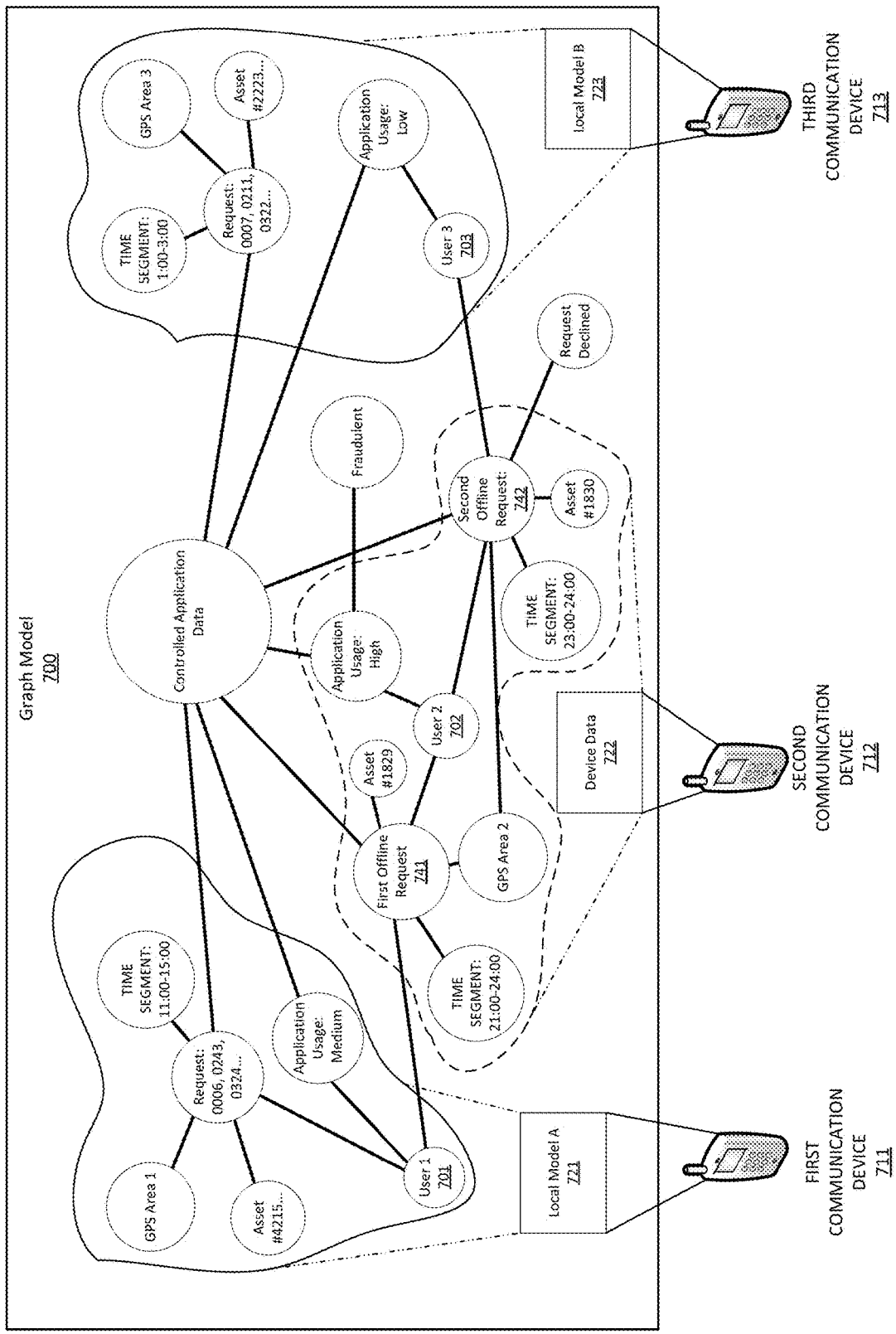
FIG. 7 shows an illustration of a graph model and sub-graphs according to embodiments.

FIG. 7 shows an illustration of a graph model update according embodiments. A graph model 700 may comprise data relating to a plurality of requests collected from a plurality of communication devices (e.g., a first communication device 711, a second communication device 712, and a third communication device 713). In embodiments, the graph model 700 may be used as a master model generated and updated by server computer (not shown). Furthermore, the master model may be used to derive local models comprising a series of graphs describing a user's typical behavior (e.g., determined from at least metadata received from the plurality of communication devices), such as the user's most likely GPS coordinates, application usage level, and time of day to be making a request.

Each of the requests may be a request to perform a function of a particular application stored at each of the devices. The particular application may be an application in which specific functions may require verification that a security value of the present state of the communication devices is of such as level to allow the particular application to perform a function. For example, the particular application may be a digital wallet application, in which an exchange of assets can be executed via mobile device. An exchange, however, may require an authentication that the security value exceeds a threshold, which may be performed by the server computer when online or locally on the communication device using a local model when offline.

In some embodiments, each communication device may receive a sub-graph of the full graph (e.g., the graph model 700) stored by the server computer. In other embodiments, each communication device may receive a machine learning model, trained by the server computer with a sub-graph, from the server computer. For example, the first communication device 711 may receive a local model A 721 from the server computer. The second communication device 712 may receive device data 722 (e.g., the data of the sub-graph). The third communication device 713 may receive a local model B 723 from the server computer.

Embodiments provide for a number of advantages. For example, embodiments allow for a communication device to determine a security value locally using a machine learning model stored by the communication device, rather than being reliant for security value determinations from a server computer with a universal machine learning model (e.g., trained on all of the data available). The machine learning model may be trained on data from a sub-graph of the full graph, where the sub-graph is associated with a community group to which the communication device and/or user of the communication device belongs. The communication device may receive the machine learning model which is trained based on data relevant to the communication device rather than all data. Additionally, the communication device may not need to receive all of the data of the graph and train the machine learning model locally. This can be advantageous due to limited memory and processing power of communication devices.

Although the steps in the flowcharts and process flows described above are illustrated or described in a specific order, it is understood that embodiments of the invention may include methods that have the steps in different orders. In addition, steps may be omitted or added and may still be within embodiments of the invention.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
    collecting, by a communication device, in which a machine learning model obtained at least in part from a server computer is stored, metadata associated with an application;
    embedding, by the communication device, the metadata associated with the application to form vectorized data;
    inputting, by the communication device, the metadata associated with the application as the vectorized data into the machine learning model;
    outputting, by the machine learning model, a security value as a result of analyzing the vectorized data, wherein the security value is related to an indication of a security threat;
    determining, by the communication device, whether the security value exceeds a predetermined threshold value;
    based on the security value exceeding the predetermined threshold value, determining, by the communication device, to run or install the application; and
    based on the security value not exceeding the predetermined threshold value:
        determining if a new profile related to a user and generated with respect to the vectorized data is different from a stored profile related to the user, by a predetermined difference amount or more,
        based on the new profile being different from the stored profile by the predetermined difference amount or more, determining to not run or install the application, and
        based on the new profile being different from the stored profile by less than the predetermined difference amount, running or installing the application.

2. The method of claim 1, wherein the metadata is application data of the application.

3. The method of claim 1, further comprising:
    prior to the collecting the metadata, collecting, by the communication device, initial data associated with one or more currently installed applications and device data;
    providing, by the communication device, the initial data to the server computer, wherein the server computer trains the machine learning model based on the initial data and communication device metadata from one or more additional communication devices and provides the machine learning model to the communication device;
    receiving, by the communication device, the machine learning model; and
    storing, by the communication device, the machine learning model.

4. The method of claim 1, further comprising:
    generating, by the communication device, an alert if the new profile differs from the stored profile by the predetermined difference amount or more.

5. The method of claim 1, further comprising:
    storing, by the communication device, the new profile if the new profile does not differ from the stored profile by the predetermined difference amount or more.

6. The method of claim 1, further comprising:
    receiving, by the communication device, a peer sub-graph from the server computer, wherein the peer sub-graph comprises data collected from a plurality of additional communication devices associated with a community group, wherein the communication device is associated with the community group; and
    training, by the communication device, the machine learning model with at least the peer sub-graph.

7. A communication device comprising:
    a processor; and
    a non-transitory computer-readable medium coupled to the processor, the non-transitory computer-readable medium comprising code, which, when executed by the processor, causes the processor to perform a method including:
        collecting metadata associated with an application;
        embedding the metadata associated with the application to form vectorized data;
        inputting the metadata associated with the application as the vectorized data into a machine learning model obtained at least in part from a server computer and stored in the communication device;
        outputting, by the machine learning model, a security value as a result of analyzing the vectorized data, wherein the security value is related to an indication of a security threat; and
        determining whether to run or install the application based on the security value,
    wherein the determining whether to run or install the application further includes:
        determining, by the communication device, whether the security value exceeds a predetermined threshold value;
        based on the security value exceeding the predetermined threshold value, determining to run or install the application; and
        based on the security value not exceeding the predetermined threshold value:
            determining if a new profile related to a user and generated with respect to the vectorized data is different from a stored profile related to the user, by a predetermined difference amount or more,
            based on the new profile being different from the stored profile by the predetermined difference amount or more, determining to not run or install the application, and
            based on the new profile being different from the stored profile by less than the predetermined difference amount, running or installing the application.

8. The communication device of claim 7, wherein the method further includes:

prior to the collecting the metadata, collecting initial data associated with one or more currently installed applications and device data;

providing the initial data to the server computer, wherein the server computer trains the machine learning model based on the initial data and communication device metadata from one or more additional communication devices and provides the machine learning model to the communication device;

receiving the machine learning model; and storing the machine learning model.

9. The communication device of claim 8, wherein the machine learning model is a neural network or a support vector machine.

10. The communication device of claim 7, further comprising:

a metadata collection module operatively coupled to the processor;

an embedding module operatively coupled to the processor; and a machine learning model module operatively coupled to the processor.

11. The communication device of claim 7, wherein the collecting the metadata associated with the application, the embedding the metadata to form the vectorized data, the inputting the vectorized data into the machine learning model, and the determining whether to run or install the application based upon the security value are performed when the communication device is not in communication with the server computer.

12. The communication device of claim 7, wherein the metadata is application data of the application.

13. The communication device of claim 7, wherein the determining whether to run or install the application further includes:

determining that the new profile is different from the stored profile by the predetermined difference amount or more;

determining to not run or install the application;

generating an alert based on the security value; and transmitting the alert to a remote computer.

14. The communication device of claim 13, wherein the remote computer is the server computer.

* * * * *